(12) United States Patent
Tojyo et al.

(10) Patent No.: US 6,441,905 B1
(45) Date of Patent: Aug. 27, 2002

(54) SHEET THICKNESS AND SWELL MEASUREMENT METHOD AND APPARATUS THEREFOR

(75) Inventors: Fumjo Tojyo; Shunzo Hirakawa, both of Osaka-fu (JP)

(73) Assignee: Yamabun Electric Co., LTD, Osaka-fu (JP)

( * ) Notice: Subject to any disclaimer, the term of this patent is extended or adjusted under 35 U.S.C. 154(b) by 0 days.

(21) Appl. No.: 09/523,230

(22) Filed: Mar. 10, 2000

(30) Foreign Application Priority Data

Mar. 23, 1999 (JP) ............................................. 11-078345
Dec. 17, 1999 (JP) ............................................. 11-359456

(51) Int. Cl.$^7$ ............................................. G01B 11/06
(52) U.S. Cl. ........................................ 356/429; 356/630
(58) Field of Search ................................ 356/429, 630, 356/631, 632; 250/559.27

(56) References Cited

U.S. PATENT DOCUMENTS

| | | | |
|---|---|---|---|
| 4,276,480 A | | 6/1981 | Watson |
| 5,107,132 A | * | 4/1992 | Pastor et al. ............ 250/559.38 |
| 5,210,593 A | * | 5/1993 | Krämer ....................... 356/631 |
| 5,617,645 A | * | 4/1997 | Wick et al. ..................... 33/551 |
| 5,696,589 A | | 12/1997 | Bernacki |

\* cited by examiner

*Primary Examiner*—Richard A. Rosenberger
(74) *Attorney, Agent, or Firm*—Jiawei Huang; J.C. Patents

(57) ABSTRACT

There is provided a sheet thickness and swell measurement method and apparatus to calibrate a characteristic map of a reference plane with accuracy and on demand, and to provide a simpler construction of means for creating the characteristic map of the reference plane and means for calibrating the characteristic map. Measurement heads 2 are moved to the width direction of sheet 9, and the thickness of the sheet is measured by the sheet thickness measurement sensors 3 installed in the measurement heads 2. The measured values of the sheet thickness are calibrated by a characteristic map MP of the moving mechanism 4 of the measurement head 2 with respect to the sheet width direction, which has been created in advance. Highly directional electromagnetic waves emitting means is arranged on one side of the main frame 1 for emitting highly directional electromagnetic waves 5a, such as light or beam, which define a reference plane for creating the characteristic map. Non-contacting position detection means 6 is installed in a part of the measurement head 2 or part of the sheet thickness measurement sensor 3 for receiving the above-mentioned highly directional electromagnetic waves 5a, such as light or beam, and for thereby detecting changes in positions of the heads 2 in the direction of the sheet thickness.

2 Claims, 3 Drawing Sheets

SHEET THICKNESS AND SWELL MEASUREMENT METHOD AND APPARATUS THEREFOR

BACKGROUND OF THE INVENTION

1. Field of the Invention

The present invention relates to a sheet thickness measurement method, swell measurement method and an apparatus for performing such measurements. Such apparatus and method are employed during the manufacturing process of various types of film and sheet, such as those made of synthetic resin, metal, paper, wood, glass, ceramic, etc., laminate films, coating membrane, and sheet type food (collectively referred to as "sheet" hereafter), to measure the thickness or swell of the sheet being manufactured. The measured thickness and/or swell are displayed and recorded to supervise the manufacturing processes, and/or to correct deviation from target thickness or target swell value.

2. Description of the Prior Art

A conventional sheet thickness measurement apparatus is equipped with a main frame having an aperture for allowing a sheet to pass therethrough; a pair of measurement heads having a pair of sheet measurement sensors; and a moving mechanism for moving the pair of measurement heads in a width direction perpendicular to a direction of the sheet passing. The conventional sheet thickness measurement apparatus measures the sheet thickness by the above-mentioned pair or sheet thickness measurement sensors, and displays the results.

However, in the manufacturing process of sheets, radiation heat, friction heat or the like causes thermal deformation and distortion, such as warp and bend, of the main frame of the measurement apparatus and guiding members of the moving mechanism for each measurement head of the measurement apparatus, which results in deterioration in measurement accuracy.

As a method for solving this problem, periodic calibration of the reference value of the measurement sensor (the zero point or the thickness of a reference, such as a master gauge, for example) has been known.

This calibration of the reference value is conducted as follows. A pair of measurement heads is moved to a position outside of the. measurement region of a sheet. Then, the pair of measurement sensors is approached until they are directly contacted to each other to perform the calibration. Alternatively, the pair of measurement sensors is indirectly contacted to each other through a reference thickness part, such as a master gauge, for example. To explain more specifically with an example, suppose that thermal deformation of the main frame occurred between the time of the previous calibration of the reference value and the time of the present calibration of the reference value. In this case, when the thickness of a master gauge is measured through the pair of measurement sensors by approaching the pair of measurement sensors relative to the master gauge, the resulting measured thickness differs from the previously measured value by an amount corresponding to the amount of the thermal deformation of the main frame. A measurement system is thus calibrated such that the measured value of the master gauge becomes a new reference value, and the measurement operation for the sheet thickness is thereafter resumed. On the other hand, in the case where the pair of measurement sensors is directly contacted to each other for the calibration instead of using a master gauger the zero point would be calibrated.

However, the methods for calibrating the reference value, as described above, have the following drawback: Because the calibration operation is performed at a position outside of the actual measurement region of a sheet, thermal deformations of the main frame and moving mechanism for each measurement head within the measurement region of the sheet cannot be comprehended. This problem is caused by the fact that the master gauge, which forms a reference plane for the measurement sensors, cannot be placed along the passage of the sheet, and leads to a serious problem of degradation in reliability of measurement accuracy in the technical fields that require high accuracy measurement of the sheet thickness in the order of micron.

In the conventional art, avoidance of the above-mentioned problem requires improvement in linear precision of a moving guide part of a guide member, such as a guide bar, of the moving mechanism of each measurement head, elimination of looseness on the sliding surfaces of the guide bar and the measurement head, and employment of technique that dissipates thermal deformation of the guide bar, etc. However these countermeasures invite high costs in manufacturing the apparatus.

SUMMARY OF THE INVENTION

Accordingly, an object of the present invention is to realize accurate and on-demand calibration of a reference value within the measurement region of a sheet by a cheaper means.

Another object of the present invention is to provide a simpler configuration of means for creating a characteristic map for the reference plane (calibration map of the reference values for the entire measurement region of a sheet) and means for calibrating the map.

A sheet thickness measurement method according to the present invention includes, as a prerequisite, the steps of moving a pair of measurement heads in a direction of a sheet width; measuring the thickness of a sheet by a pair of sheet thickness measurement sensors installed on the measurement heads; and calibrating the measured values of the sheet thickness by a preliminary prepared characteristic map of the measurement heads with respect to the direction of the sheet width. In particular, the present invention is characterized by use of highly directional electromagnetic waves, such as light or beam, as a reference plane for creating the characteristic map.

Specifically, the method is characterized as follows: The highly directional electromagnetic waves, such as light or beam, which become the reference plane of the characteristic map, are emitted from one side of a main frame in a direction substantially parallel to a moving direction of each measurement head. Non-contacting position detection means is installed on a part of each measurement head or each sheet thickness measurement sensor, and each non-contacting position detection sensor receives the above-mentioned highly directional electromagnetic waves, such as light or beam, periodically, or continuously or on demand during the measurement operation, to detect displacements of the respective measurement heads relative to the above-mentioned reference plane. The characteristic map is then calibrated by these detected values.

According to the above-mentioned construction, it is possible to conduct accurate and on-demand calibration of the characteristic map of the reference plane. Further, it becomes possible to have a simpler construction of means for creating the characteristic map of the reference plane and its calibration means.

In the sheet thickness measurement method mentioned above, when a contacting sheet thickness measurement sensor is used, reference values are calibrated by having the above-mentioned pair of sheet thickness measurement sensors approaches and contacts to each other or to a master gauge periodically, or continuously or on demand during each measurement operation, at both ends of the moving range of the pair of measurement heads.

In the sheet thickness measurement method mentioned above, when a non-contacting sheet thickness measurement sensor is used, reference values are calibrated by having the above-mentioned pair of sheet thickness measurement sensors approaches to a master gauge periodically, or continuously or on demand during each measurement operation, at both ends of the moving range of the pair of measurement heads.

The above-mentioned calibration is performed at the time of creating the characteristic map and at the time of correcting the characteristic map.

In another aspect, a sheet thickness measurement method according to the present invention includes the steps of moving a pair of measurement heads in a direction of a sheet width; measuring the thickness of a sheet by a pair of sheet thickness measurement sensors installed on the above-mentioned measurement heads; concurrently therewith receiving, by non-contacting position detection means installed in each measurement head, directional electromagnetic waves, such as light or beam, that are emitted from one side of a main frame in a direction substantially parallel to a moving direction of each measurement head to detect displacements of each measurement head in a direction of the sheet thickness relative to a reference plane defined by the above-mentioned highly directional electromagnetic waves; and calibrating the measured values of the sheet thickness by measurement sensors installed on the above-mentioned measurement heads directly in accordance with the displacements of each measurement head from the reference plane, which are detected by the above-mentioned non-contacting position detection means.

According to this method, the measured value of each measurement sensor is directly calibrated without a need of the characteristic map. Thus, it becomes possible to monitor thermal deformation and the like in real time and to measure the sheet thickness with improved accuracy.

In still another aspect, a sheet thickness measurement apparatus according to the present invention includes, as a prerequisite, a main frame having an aperture for passing a sheet therethrough; a pair of measurement heads having a pair of sheet thickness measurement sensors; and a moving mechanism for moving the above-mentioned pair of measurement heads in a width direction perpendicular to a direction of the sheet passing, wherein the above-mentioned pair of sheet thickness measurement sensors measures a sheet thickness, and the measured values of the sheet thickness are calibrated by a characteristic map of the moving mechanism of each measurement head with respect to a direction of the sheet width. The sheet thickness measurement apparatus according to the present invention is further characterized by comprising highly directional electromagnetic waves emitting means installed in one side of the main frame, for emitting, from one side of the main frame, highly directional electromagnetic waves, such as light or beam, which become a reference plane for creating the characteristic map, in a direction substantially parallel to a moving direction of each measurement head; and non-contacting position detection means, installed in a part of each measurement head or part of each sheet thickness measurement sensor, for detecting changes in position of each measurement head in a direction of the sheet thickness through receiving the above-mentioned highly directional electromagnetic waves, such as light or beam.

The sheet thickness measurement apparatus of the present invention may be further characterized in that the means for emitting the highly directional electromagnetic waves towards each of the non-contacting position detection means comprises one highly directional electromagnetic waves emitting means and means for splitting highly directional electromagnetic waves, such as light or beam, emitted from the above-mentioned one highly directional electromagnetic waves emitting means.

The sheet thickness measurement apparatus above may be further characterized in that the installation position of each non-contacting position detection means is along a measurement axis of the corresponding sheet thickness measurement sensor or adjacent thereto.

The sheet thickness measurement apparatus of the present invention may be further characterized in that the non-contacting position detection means includes deflecting means for deflecting and receiving the highly directional electromagnetic waves, such as light or a beam, emitted from the highly directional electromagnetic waves emitting means.

The sheet thickness measurement apparatus of the present invention may be further characterized in that the highly directional electromagnetic waves emitting means emits parallel light rays having a single optical axis. The sheet thickness measurement apparatus of the present invention may be further characterized in that the highly directional electromagnetic waves emitting means emits parallel light rays having a plurality of optical axes parallel to each other.

The sheet thickness measurement apparatus of the present invention may be further characterized in that the highly directional electromagnetic waves emitting means is a laser light generator.

The sheet thickness measurement apparatus of the present invention may be further characterized in that the non-contacting position detect ion means is one-dimensional position detection means that is in parallel with the direction of the sheet thickness.

The sheet thickness measurement apparatus of the present invention may be further characterized in that the non-contacting position detection means is two-dimensional position detection means including the direction of the sheet thickness.

The sheet thickness measurement apparatus of the present invention may be further characterized in that the non-contacting position detection means is optical position detection means.

In a further aspect, a sheet swell measurement apparatus according to the present invention is characterized by measuring a swell of one side of a sheet by disposing highly directional electromagnetic waves emitting means and non-contacting position detection means on one side of the sheet. In particular, the measurement of the swell may be conducted using the sheet thickness measurement apparatus of the present invention on only one side; however, it is preferable to install the apparatus on both sides and use only necessary one without using the other unnecessary one*

These and other objects and advantages of the present invention will become clear from the following description with reference to the accompanying drawings

BRIEF DESCRIPTION OF THE DRAWINGS

In the accompanying drawings

DETAILED DESCRIPTION OF THE PREFERRED EMBODIMENTS

Figure 1:
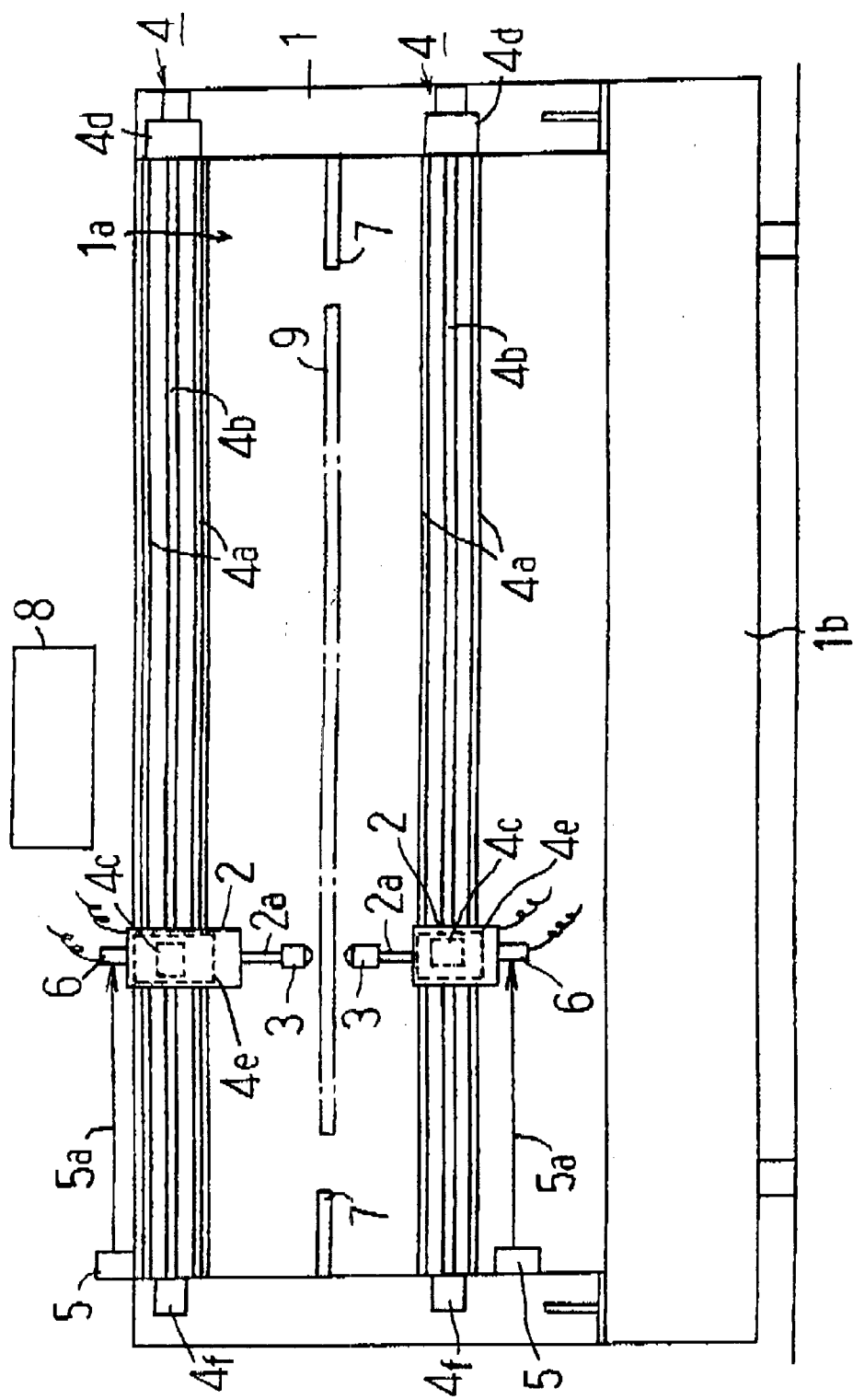
FIG. 1 is an overall schematic front view showing a first preferred embodiment of the present invention.

FIG. 1 is a schematic front view of a first preferred embodiment of the present invention. In FIG. 1, reference numeral 1 designates a main frame; reference numeral 2 designates a measurement head; reference numeral 3 designates a sheet thickness measurement sensor; reference numeral 4 designates a moving mechanism; reference numeral 5 designates highly directional electromagnetic waves emitting means; reference numeral 6 designates non-contacting position detection means; reference numeral 7 designates a master gauge; reference numeral 8 designates a control part for setting operation programs; and reference numeral 9 designates a sheet.

The main frame 1 has an aperture 1a which allows the sheet 9 to pass therethrough, and is fixed on a base 1b. The base 1b is installed on a floor or the like such that height is adjustable, and wheels for transportation may be installed thereon.

The measurement heads 2 are moveably supported via moving mechanisms 4 on the main frame 1 so that they move in the width direction (right and left directions in FIG. 1) that is perpendicular to the direction of the sheet passing.

The sheet thickness measurement sensors 3 may be a contact sensor that contacts the surface of the sheet 9 to detect the thickness variations, or may be a non-contact sensor. The thickness measurement sensor 3 may be installed on a part of the measurement sensor 2 through approach/retract means 2a in an approachable/retractable manner, or may be installed directly on the measurement sensor 2, A hydro pneumatic cylinder or other appropriate types of actuators may be used as the approach/retract means 2a.

Also, the sheet thickness measurement sensor 3 may adopt any types of the displacement detection systems, such as a linear gauge, an electrical micrometer, air type one, optical reflective type one, laser reflective type one, ultrasonic reflective type one, electrostatic capacity type one, and a magnetic induction type one, etc.

Moving mechanism 4 is for moving the respective measurement head 2 in the width direction of the sheet 9. For example, as shown in FIG. 1, each moving mechanism 4 may be constructed of a guide bar 4a, a ball screw shaft 4b, a ball nut member 4c, and a forward/reverse rotary motor 4d. The guide bar 4a and the ball screw shaft 4b are installed on and supported by the main frame 1 along the moving direction of the measurement head 2. The measurement head 2 is installed so as to be movable along the guide bar 4a through a slide member 4e. The measurement head 2 is engaged with the ball screw shaft 4b through the ball nut member 4c so as to be movable in the right and left directions by the forward/reverse rotations of the forward/reverse rotary motor 4d, which is connected to one end of the ball screw shaft 4b. The movement amount of the measurement head 2 is fed back to a control part 8 for setting operation programs, which will be described later, by rotary encoder 4f, which is installed in the other end of the ball screw shaft 4b. Although in FIG. 1, the measurement head 2 and the moving mechanism 4 are installed at each of the upper and lower sides of the sheet 9, it is possible to have only one forward/reverse rotary motor 4d with an appropriate interlocking mechanism (not shown in the figure) to move the upper and lower moving heads 2 in an interlocked manner. Also, pulleys and belts, or mechanisms other than the above-mentioned ball screw system may be used as the moving mechanism 4. Here, in the case of measuring the swell of the sheet 9, the system may be configured to have the measurement head 2 installed only on one side of the sheet 9.

The highly directional electromagnetic waves emitting means 5 is for emitting highly directional electromagnetic waves 5a, such as light or beam, from one side of the main frame 1 in a direction substantially parallel to the moving direction of the measurement head 2. The highly directional electromagnetic waves so emitted define a reference plane for used in creating a characteristic map. As shown in FIG. 1, the highly directional electromagnetic waves emitting means 5 is fixedly arranged on one side of the main frame 1.

The above-mentioned highly directional electromagnetic waves emitting means 5 may be of the type which emits highly directional electromagnetic waves 5a, such as parallel light having a single optical axis, as shown in the FIGS. 2(A) and 2(B), or alternatively, of the type which emits highly directional electromagnetic waves 5a, such as parallel light having a plurality of optical axes, as shown in FIG. 2(C). Either construction is acceptable.

Further, the above-mentioned highly directional electromagnetic waves emitting means 5 maybe a laser light generation apparatus, or apparatus that emits directional parallel light through optical lens systems, etc.

As shown in FIG. 1, non-contacting position detection means 6 is fixedly arranged on a part of the measurement head 2. The non-contacting position detection means receives the highly directional electromagnetic waves 5a, such an light or beam, emitted from the highly directional electromagnetic waves emitting means 5 to detect changes in the position of the measurement head 2 in the direction of the sheet thickness in order to create and calibrate a characteristic map. Means for creating and calibrating the characteristic map (not shown in the figure) is embedded into the control part 8 for setting operation programs, which will be described later, so that it can utilize a CPU in the control part 8 for processing, storing, and updating.

As shown in FIG. 2(A), the above-mentioned non-contacting position detection means 6 may utilize one-dimensional position detection means 6b, which is parallel with the thickness direction of sheet 9, coupled with converging lens 6a. Alternatively, as shown in FIG. 2(B), in order to further improve the accuracy, the non-contacting position detection means 6 may utilize a two-dimensional position detection means 6c including the thickness direction of the sheet 9, coupled with converging lens 6a, for detecting the center position (or center of intensity distribution) of the highly directional electromagnetic waves 5a, such as light or beam. In the case of the one-dimensional detection, the position of the center (or center of intensity distribution) of the received highly directional electromagnetic waves 5a, such as light or beam, is detected as the X- or Y-coordinate value. In the case of the two-dimensional detection, the center position is detected as the X-coordinate value and Y-coordinate value.

The above-mentioned non-contacting position detection means 6 is constructed of optical position detection means, such as CCD or PSD (semiconductor position detection device using a photodiode), or electromagnetic wave type position detection means.

The non-contacting position detection means 6 is installed in the measurement head 2 along the measurement axis of the sheet thickness measurement sensor 3 or adjacent thereto.

As shown in FIG. 2(D), the non-contacting position detection means 6 may be installed in a part of the measurement head 2 or part of the sheet thickness measurement sensor 3 in such a way as to receive the highly directional electromagnetic waves 5a, such as light or beam, emitted from the highly directional electromagnetic waves emitting means 5 after deflecting the electromagnetic waves 5a at about 90 degrees via deflection means 6d, such as a reflective mirror. In this configuration, the vertical displacements of the measurement head 2 relative to the reference plane defined by the highly directional electromagnetic waves 5a, such as light or beam, emitted from the highly directional electromagnetic waves emitting means 5, are converted to horizontal displacements and detected as such.

Figure 2:
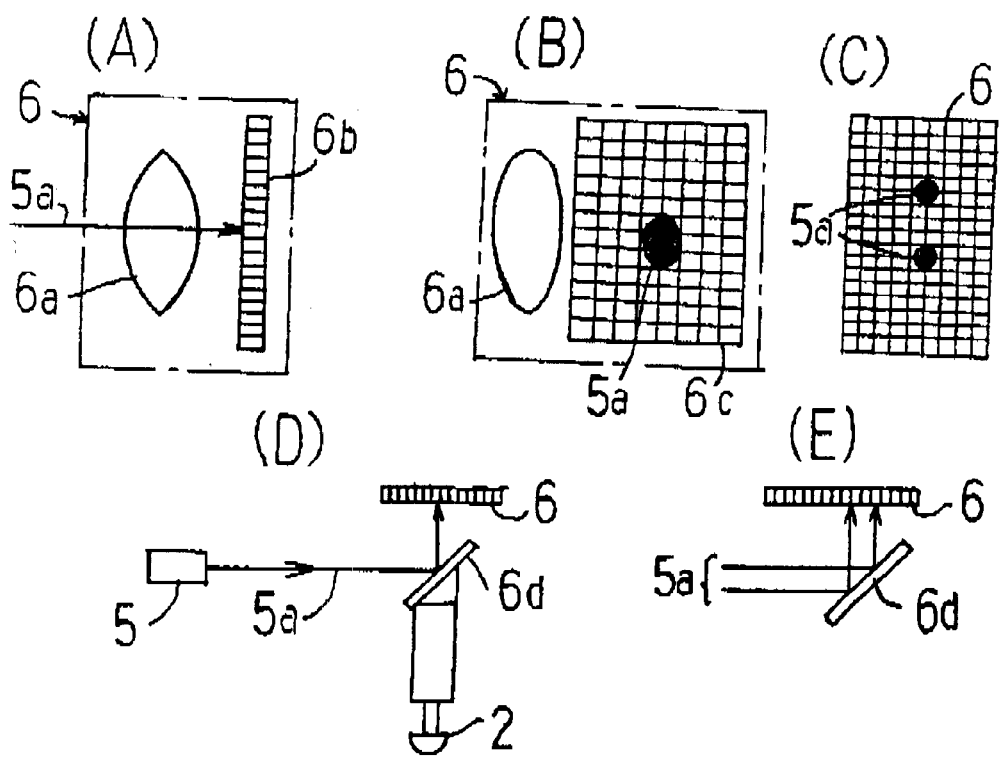
FIG. 2(A) schematically shows a construction of one-dimensional non-contacting position detection means.
FIG. 2(B) is a perspective view schematically showing two-dimensional non-contacting position detection means.
FIG. 2(C) is a schematic front view showing an exemplary construction of highly directional electromagnetic waves, such as light or beam, having a plurality of optical axes, and two-dimensional non-contacting position detection means, and shows a receiving condition on the non-contacting position detection means.
FIG. 2(D) schematically shows a construction of non-contacting position detection means combined with deflection means.
FIG. 2(E) schematically shows a construction of non-contacting position detection means combined with highly directional electromagnetic waves, such as light or beam, having two optical axes and deflection means.

Also, as shown in FIG. 2 (E), the highly directional electromagnetic waves emitting means 5 may emit highly directional electromagnetic waves 5a having a plurality of optical axes parallel to each other, and deflection means 6d, such as a reflective mirror or the like, may be used on the receiving side. In this case, if the measurement head 2 is inclined, the distances between the plurality of optical axes of the electromagnetic waves received on the non-contacting position detection means 6 change. Thus, from the amount of these changes, it is possible to detect the inclination of the measurement head 2 and to create and calibrate a characteristic map accordingly.

The control part 8 for setting operation programs sets and controls operation programs, such as procedures of creating a characteristic map, operational procedures for measuring the sheet thickness, and procedures for calibrating the characteristic map, etc., and is installed in an operation board, etc. (not shown in the figures). Further, operation display means and setting value display means, etc., may also be installed if desired.

A first preferred embodiment of the present invention is constructed as described above. Referring to FIG. 1, the operation of this embodiment will be explained.

Creation of a characteristic map is normally conducted when sheet 9 is absent (however, the sheet may be present). First, a pair of measurement heads 2, 2 is moved to one end of moving range thereof (the left end in FIG. 1, for example) by moving mechanisms 4, 4. At that position, a pair of sheet thickness measurement sensors 3, 3 is approached towards a master gauge 7 to calibrate the reference value.

When contacting sensors are used, the above-mentioned sensors 3, 3 are made in contact with the master gauge 7, and the measured value of each sensor is detected and stored in map creation means as a zero point or reference value (the actual thickness of the gauge 7).

When non-contacting sensors are used, the above-mentioned sensors 3, 3 are approached toward the master gauge 7 up to a predetermined distance from the master gauge 7. This predetermined distance is a distance (space) where the back pressure of an air nozzle becomes a constant value in the case of air type sensors, or is a distance where the focal length of a light receiving device side is matched in the case of optical reflective type sensors. In the condition where the sensors 3, 3 reaches the above-mentioned predetermined distance, the sensors 3, 3 detect the measured values, and the detected values are stored in the map creation means as a zero point of the reference plane or reference value (the actual thickness of the gauge 7).

Figure 3:
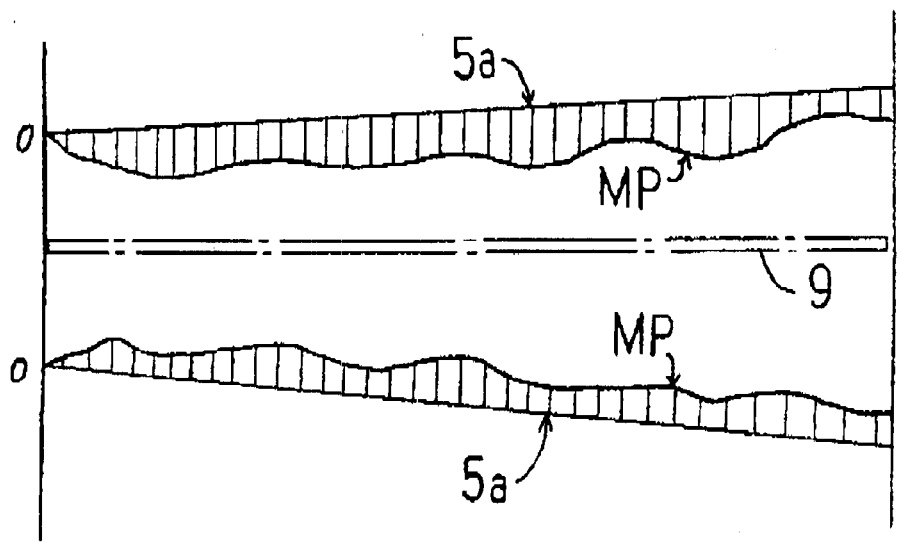
FIG. 3 is an explanatory figure showing the characteristics of a characteristic map in an exaggerated manner.

Next, after the above-mentioned sensors 3, 3 are vertically retracted over a space, or while they remain at the same vertical positions, the measurement heads 2, 2 are moved toward the other end (the right end in FIG. 1, for example) by moving mechanisms 4, 4. During this movement, the displacements of the measurement heads 2, 2 in the vertical directions are continuously or intermittently measured by the respective non-contacting position detection means 6,6 using, as the reference planes, the highly directional electromagnetic waves 5a, 5a, such as light or beams, which are emitted from the highly directional electromagnetic waves emitting means 5, 5. The measured displacements are stored in the map creation means. As a result, a characteristic map MP, such as shown in FIG. 3 is obtained. At the other end mentioned above, the pair of sensors 3, 3 is approached toward the master gauge 7, and the then measured values of the above-mentioned pair of sensors 3, 3 are detected. The thus detected values are stored in the map creation means as a zero point of the reference plane or reference value at the right end of FIG. 1.

The detected values (actual measurement values) of the master gauges 7, 7 at the left and right ends are compared. The difference between these values correspond to initial spreading amounts between the above-mentioned upper and lower highly directional electromagnetic waves 5a, 5a at the left and right ends. This difference is stored in the map creation means as the initial spreading amounts of the upper and lower highly directional electromagnetic waves 5a, 5a at the left and right ends.

In the present invention, the highly directional electromagnetic waves 5a, 5a, such as light or beams, which are emitted from the respective highly directional electromagnetic waves emitting means 5, and which defines the respective reference planes, need not be in geometrical parallel with each other. A slight spread is acceptable. Although in FIG. 3, such a condition is exaggerated, as long as a certain degree of parallelism exists it is acceptable. This spread is incorporated by calibrating the zero point or reference value as the values (the actual measurement values) of the master gauges 7 detected by the pair of sensors 3, 3 at the left and right ends of FIG. 1, so that the upper and lower reference planes may be treated as geometrically parallel to each other during the thickness measurement of the sheet 9.

By the procedures described above, the upper and lower reference planes are corrected to be parallel to each other electrically within the control means, and the resulting characteristic map MP provides information representing parallelism precision of the guide bars 4a, 4a relative to the respective corrected reference planes over the entire measurement region of the sheet 9 for the moving mechanisms 4, 4 of the respective measurement heads 2, 2. Thus, the present invention improves the accuracy of hardware by software.

Next, the operation for measuring the thickness of sheet 9 is explained. The measurement heads 2, 2 are moved by the moving mechanisms 4, 4, and the thickness of the sheet 9 is measured by the upper and lower thickness measurement sensors 3, 3. The measured values include errors due to looseness or the like of the moving mechanisms 4, 4. Thus, the measured values of the above-mentioned upper and lower sheet thickness measurement sensors 3, 3 are calibrated by the above-mentioned characteristic map MP, and the calibrated value is stored and displayed as the thickness of the sheet 9 (variations relative to the reference value).

The characteristic map MP is calibrated periodically or, during every measurement operation, continuously or on demand. The calibration of the characteristic map MP is performed in a manner similar to that for creating the characteristic map mentioned above. Such calibration can produce a characteristic map MP in which thermal deformation of the main frame 1 or the like is corrected. In the measurements of the sheet thickness thereafter, the measured values of the measurement sensors 3, 3 are being calibrated using the characteristic map MP that has accordingly been updated.

The above-mentioned calibration of the characteristic map MP may be conducted separately from the measurement operation of the sheet thickness, or may be conducted concurrently with the measurement of the sheet thickness.

In the case of a separate calibration of the characteristic map MP, when the characteristic map MP is to be calibrated, measured values of the sensors 3, 3 are ignored (or the sensors are made inactive), and when the sheet thickness is to be measured, non-contacting position detection means 6, 6, are made inactive or ignored.

In the case that calibration of the characteristic map MP is to be conducted concurrently with measurement of the sheet thickness, the detected values at the non-contacting position detection means 6, 6 with respect to the highly directional electromagnetic waves 5a, 5a, which are emitted from the highly directional electromagnetic waves emitting means 5, 5, are acquired to calibrate the characteristic map MP at the same time of measuring and storing. the thickness of the sheet 9 by the upper and lower thickness measurement sensors 3, 3. The thus calibrated characteristic map MP is used to calibrate stored values measured by the above-mentioned thickness measurement sensors 3, 3, and the calibrated value is stored and displayed as the thickness of the sheet 9.

In this case, it should be understood that instead of actually creating a characteristic map MP, the measured values of the above-mentioned sensors 3, 3 may be calibrated directly by acquiring the detected values of the non-contacting position detection means 6, 6 with respect to the highly directional electromagnetic waves 5a, 5a, which are emitted from the highly directional electromagnetic waves emitting means 5a, 5a, at the same time of measuring and storing the thickness of the sheet 9 by the upper and lower sheet thickness measurement sensors 3, 3. Then, the thus directly calibrated values are stored and displayed as the thickness of the sheet 9, That is, in this case, the characteristic map MP is not used, and the above-mentioned calibration is conducted every time the thickness of sheet 9 is measured. In this way, through performing real time correction of errors including precision errors of the moving mechanisms 4, 4, assembly errors of the main frame 1, and error factors due to thermal deformation and vibrations, etc., the thickness of the sheet 9 can be measured with high accuracy.

Figure 4:
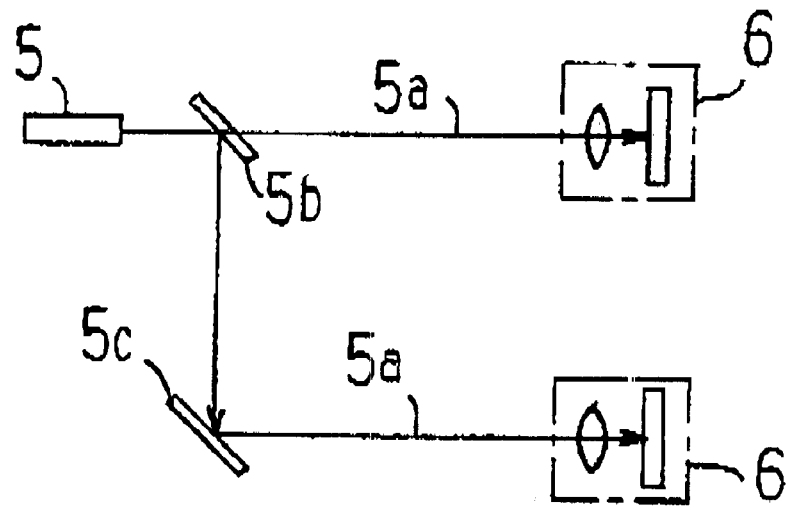
FIG. 4 is an overall schematic front view showing a second preferred embodiment of the present invention.

Further, as shown in FIG. 4, in a thickness measurement apparatus of the present invention, only one highly directional electromagnetic waves emitting means 5 may be fixedly arranged on one side of the main frame 1 and non-contacting position detection means 6 may be fixedly arranged on a part of each of the measurement heads 2, 2, which are disposed on the upper and lower sides of the sheet 9, respectively. In this construction, highly directional electromagnetic waves 5a, such as light or beam, emitted from the above-mentioned highly directional electromagnetic waves emitting means 5, are received by the respective above-mentioned non-contacting position detection means through a splitting means 5b, such as a half mirror, and deflection means 5c, such as a reflective mirror. Here, as the splitting means and deflecting means, a prism or the like may be used. The above-mentioned splitting means and deflection means are to be fixed on the main frame 1 in correspondence with the respective optical axes. The operation of this example is substantially the same as that of the above-mentioned first preferred embodiment, and the explanation thereof is accordingly omitted.

Figure 5:
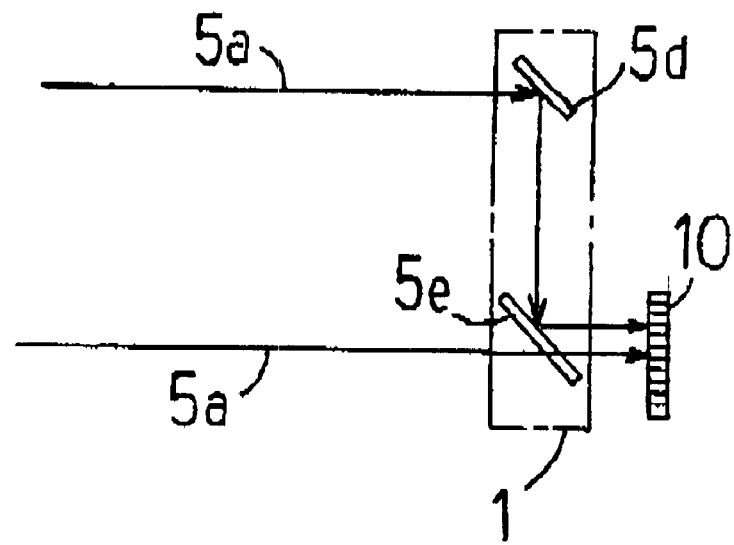
FIG. 5 is a schematic front view showing relevant parts of a modified embodiment of the present invention.

Also, as shown in FIG. 5, in a thickness measurement apparatus of the present invention, a total reflection mirror 5d and a half mirror 5e may be fixedly arranged in the main frame 1 at the end opposite to the end at which the highly directional electromagnetic waves emitting means 5 is arranged. The total reflection mirror dd and the half mirror 5e are installed in correspondence with the upper optical axis and the lower optical axis, respectively, which are on upper and lower sides of the sheet 9. A displacement detection means 10 is fixedly arranged in the main frame 1 and is coupled with these mirrors to detect a displacement amount (spread amount in the vertical direction) of the main frame 1 at the end of the main frame 1. As this displacement detection means 10, a device similar to the above-mentioned non-contacting displacement detection means 6 shown in FIG. 2(A) may be used. Here, as the non-contacting position detection means 6, 6 installed in a pair of the measurement heads 2, 2, instead of the deflection means 6d, such as a reflective mirror, of FIG. 2(D), a half mirror which is installed at 45 degrees is used.

In the case of measuring the swell of the upper surface or lower surface of the sheet 9, only one of the pair of upper and lower heads 2, 2 may be used.

According to the thickness measurement method of the present inventions it is possible to calibrate the characteristic map of the reference plane with accuracy and on demand. Further, means for creating and means for calibrating the characteristic map of the reference plane can be constructed in a simpler configuration. Further, according to the thickness measurement apparatus of the present invention, it is possible to provide an apparatus suitable for performing the above-mentioned method of the inventions at lower costs.

Also, according to the present invention, it is possible to significantly improve the accuracy of the sheet thickness measurements.

The present invention is also applicable to measurements of the swell of a sheet.

While there has been described what are at present considered to be preferred embodiments of the present invention, it will be understood that various modifications May be made thereto, and it is intended that the appended claims cover all such modifications as fall within the true spirit and scope of the invention.

What is claimed is:

1. A sheet thickness measurement method, comprising the steps of:

moving a pair of measurement heads in a direction of a sheet width;

measuring the thickness of a sheet by a pair of sheet thickness measurement sensors installed on said measurement heads; and calibrating measured values of the sheet thickness by a preliminary prepared characteristic map of said measurement heads with respect to the direction of the sheet width, the sheet thickness measurement method being characterized by using highly directional electromagnetic waves, such as light or beam, as a reference plane for creating said characteristic map;

wherein when a contacting sheet thickness measurement sensor is used, reference values are calibrated by having said pair of sheet thickness measurement sensors approach and contact to each other or to a master gauge periodically, or continuously or on demand during each measurement operation, at both ends of the moving range of the pair of measurement heads.

2. A sheet thickness measurement method, comprising the steps of:

moving a pair of measurement heads in a direction of a sheet width;

measuring the thickness of a sheet by a pair of sheet thickness measurement sensors installed on said measurement heads; and calibrating measured values of the sheet thickness by a preliminary prepared characteristic map of said measurement heads with respect to the direction of the sheet width, the sheet thickness measurement method being characterized by using highly directional electromagnetic waves, such as light or beam, as a reference plane for creating said characteristic map;

wherein when a non-contacting sheet thickness measurement sensor is used, reference values are calibrated by having said pair of sheet thickness measurement sensors approach to a master gauge periodically, or continuously or on demand during each measurement operation, at both ends of the moving range of the pair of measurement heads.

* * * * *